US007971619B2

(12) United States Patent
Eitel et al.

(10) Patent No.: US 7,971,619 B2

(45) Date of Patent: Jul. 5, 2011

(54) STAMPING CYLINDER

(75) Inventors: Johann Emil Eitel, Thüngen (DE); Matthias Gygi, Montreux (CH)

(73) Assignee: KBA-Giori S.A., Lausanne (CH)

( * ) Notice: Subject to any disclaimer, the term of this patent is extended or adjusted under 35 U.S.C. 154(b) by 1111 days.

(21) Appl. No.: 11/547,484

(22) PCT Filed: Apr. 5, 2005

(86) PCT No.: PCT/IB2005/000965

§ 371 (c)(1), (2), (4) Date: Sep. 29, 2006

(87) PCT Pub. No.: WO2005/102733

PCT Pub. Date: Nov. 3, 2005

(65) Prior Publication Data

US 2008/0271854 A1 Nov. 6, 2008

(30) Foreign Application Priority Data

Apr. 22, 2004 (EP) .................................... 04009507

(51) Int. Cl.
*B32B 37/00* (2006.01)

(52) U.S. Cl. ....................................... 156/553; 156/582

(58) Field of Classification Search ........................ None
See application file for complete search history.

(56) References Cited

U.S. PATENT DOCUMENTS

| | | | | |
|---|---|---|---|---|
| 3,513,772 | A | 5/1970 | Brasty | |
| 4,217,824 | A * | 8/1980 | Rebel et al. | 101/375 |
| 5,109,767 | A | 5/1992 | Nyfeler et al. | |
| 5,178,068 | A * | 1/1993 | Junghans et al. | 101/415.1 |
| 5,429,044 | A | 7/1995 | Giori et al. | |
| 6,062,134 | A | 5/2000 | Eitel et al. | |
| 6,112,651 | A | 9/2000 | Eitel et al. | |
| 6,171,429 | B1 | 1/2001 | Aindow et al. | |
| 6,263,790 | B1 | 7/2001 | Wyssmann et al. | |
| 2001/0000859 | A1 | 5/2001 | Lomax et al. | |

FOREIGN PATENT DOCUMENTS

| | | | |
|---|---|---|---|
| DE | 41 25 996 | C1 | 3/1993 |
| GB | 2 255 317 | A | 11/1992 |
| WO | WO 96/37368 | A1 | 11/1996 |

OTHER PUBLICATIONS

US 2001/0013282 A1, 08/2001, LaBelle et al. (withdrawn)

* cited by examiner

*Primary Examiner* — John L. Goff
*Assistant Examiner* — Barbara J. Musser
(74) *Attorney, Agent, or Firm* — Seager, Tufte & Wickhem, LLC

(57) ABSTRACT

A cylinder for stamping planar substrates, such as sheets of paper comprises at least a pit with clamping means for holding a stamping medium on said cylinder, said medium comprising at least a row of stamps distributed along the medium. The medium is formed by a stamping plate or by stamping strips and said cylinder further comprises at least a supporting piece forming a bridge over said pit.

21 Claims, 3 Drawing Sheets

STAMPING CYLINDER

FIELD

Figure 1:
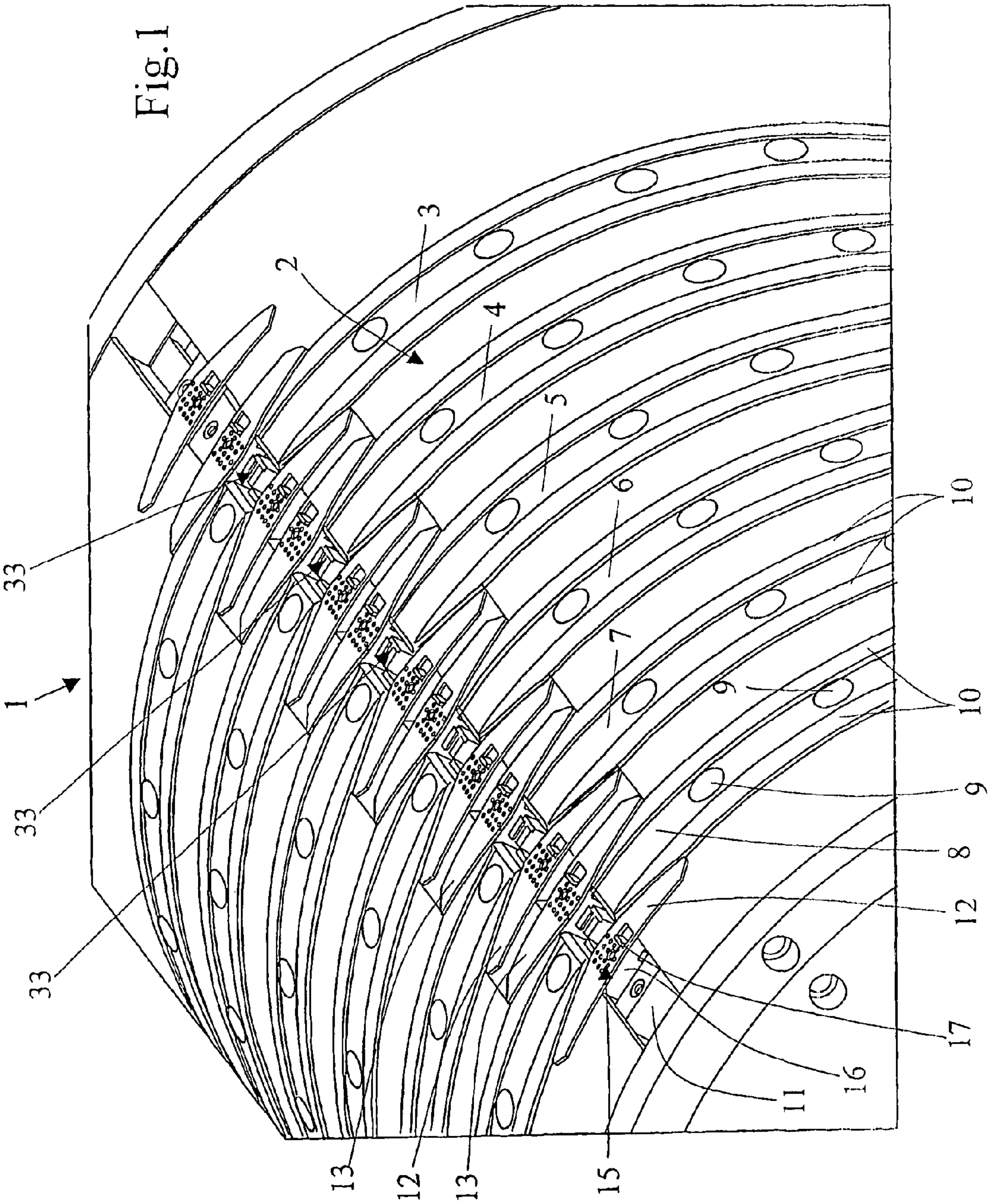

The present invention concerns a stamping cylinder for planar substrates, such as sheets of paper which carry printed matter.

BACKGROUND

It is known in the art of printing machines for securities, for example bank notes, to apply security elements with stamping cylinders. For example, PCT application No WO 96/37368, the content of which is incorporated by reference in the present application, discloses a printing method and apparatus using a hot foil stamping.

In the field of printing securities, it is known to apply a thin layer of metal foil of predetermined shape or pattern to a substrate, for example bank notes, usually as a feature intended to make counterfeiting more difficult. In a known application, the foil is carried as a continuous lamination between a carrier substrate and a layer of hot melt adhesive, the shape or pattern to be applied being determined by a stamp or press. In prior art arrangements the carrier substrate and the substrate are placed together beneath a platen-type press carrying an array of stamps which are simultaneously applied to cause an array of hot foil imprints to be applied to the substrate. Heat for activating the hot melt adhesive is generally applied from the press. The printing apparatus for applying foil to a substrate comprises means for conveying a carrier for the foil together with an adhesive which is activated by heat in a printing position, means for conveying substrate towards said printing position, printing means at which the carrier and substrate are moved together past said printing position at which pressure is applied to transfer a predetermined pattern or shape of foil from the carrier to the substrate, and preheating means for transferring heat to the carrier before it reaches the printing position and/or before it contacts the substrate. Preferably the preheating means is effective to transfer heat to the carrier immediately upstream of the printing position. For example, where the printing means comprises a nip between a print cylinder and a counter cylinder the pre-heating means may be located to be effective as close as possible to said nip. In a preferred arrangement the printing means comprises means for applying both pressure and heat at said printing position. For example, the printing means may comprise a print cylinder carrying one or more stamps defining said predetermined pattern and/or shape, the cylinder carrying heating means in the vicinity of said stamp or stamps.

For example, U.S. Pat. No. 6,263,790, the content of which is incorporated by reference in the present application, discloses a machine for security printing on security paper on which security elements carried by a foil are applied to the security prints by a cylinder comprising heated stamps.

Another prior art publication, U.S. Pat. No. 6,062,134, the content of which is incorporated by reference in the present application, discloses a stamping cylinder comprising a plurality of stamps, said stamps being mounted on the cylinder through adjustable means allowing each of the stamps to be adjusted in the axial direction and in the circumferential direction of the stamping cylinder.

A further prior art is disclosed in U.S. Pat. No. 5,429,044, the content of which is incorporated by reference in the present application. In this patent, a machine for security printing on security papers, especially bank notes, is described, said machine comprising a device for feeding with paper, a device for transporting the paper and a unit for applying optically variable images supported by at least one tape which is brought into contact with the paper such that these images are applied at defined locations on the paper corresponding to the printing marks on security papers. The application unit includes at least one applicator cylinder interacting with a pressure cylinder, the paper moving along between these cylinders. The tape is mounted between two reels arranged in a sector of the applicator cylinder and the tape passes along a generatrix of said applicator cylinder, perpendicularly to the path of the paper, under the action of a servomotor acting intermittently at each application step.

Other prior art publications include DE 41 25 996 C1 which relates to a heatable stamping roller with a hollow drum member comprising an internal heating system and a drum mantle with a stamping profile and at least a segment which is interchangeable and located on the drum mantle. The advantage of this design is that the stamping surface can be changed without having to dismantle the heatable roller section.

Finally, publication GB 2 255 317, the content of which is incorporated by reference in the present application, discloses a foil deposition machine which transfers the foils from a carrier onto a surface to be decorated. As indicated in this prior art, foil transfer is conventionally carried out as a flat-bed process, with a die being mounted oh a flat bed and the surface to which the decorative layer is to be applied (i.e. print material) being mounted on the surface of an impression cylinder. The flat bed with the die moves backwards and forwards relative to the impression cylinder, along a path which is tangential relative to the cylinder. A band of foil is supported above the die. As the die approaches the cylinder surface, the foil is pressed by the die (which has been heated to a suitable temperature) against the print material on the cylinder, and the decorative layer is transferred to the print material. The print material is usually paper or card, but may be of plastics or other materials. When the die moves away from the cylinder, the release agent allows the carrier layer to be released from the decorative layer. In order to avoid the inherent slowness of a flat-bed process, it has been proposed to carry out foil blocking by a rotary process. Hitherto, this has required the construction of cylinders on which the foil blocking stamps are engraved. The construction of such cylinders is very expensive, and because the die surface is integral with the body of the cylinder, there are often problems in ensuring correct registration of the die surface with the print material. In GB 2 255 317, there is provided a foil blocking die mounted on a substrate, which substrate is adapted to be secured around the circumference of a cylinder. The use of a die which can be mounted on a cylinder surface for operation, but can be dismounted from the cylinder surface has the particular advantage that the higher operating speeds possible with rotary equipment, as compared to reciprocating equipment, can be obtained.

A problem with the design of GB 2 255 317 is the presence of a non-continuous surface of the plate carrying the stamps forming an opening, which produces vibrations in the machine when the pressure cylinder passes the opening of the plate. Such vibrations then are the cause of improper application of foil or misregistration of printing. A solution to overcome this problem is to mount the cylinders on laterally displaceable axis, for example with excentrical bearings, to relive the pressure when passing such openings but this design is complicated and expensive.

SUMMARY

It is therefore an aim of the present invention to improve the known machines.

A further aim of the invention is to provide a stamping machine with a stamping cylinder that is easy to operate.

A further aim of the present invention is to provide a stamping cylinder that allows retrofitting into existing machines.

To this effect, the invention complies with the definition of the claims.

BRIEF DESCRIPTION

Figure 2:
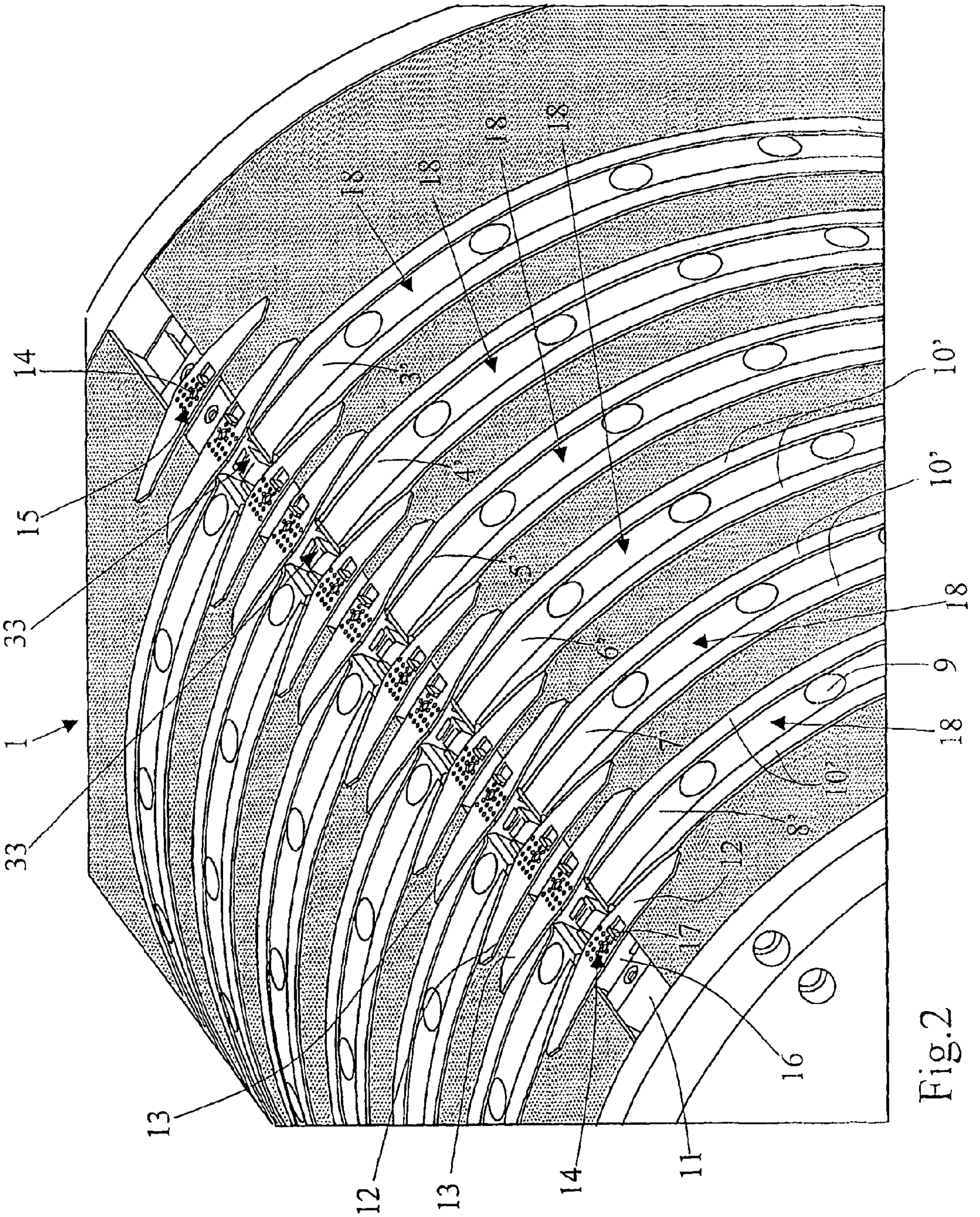
Figure 3:
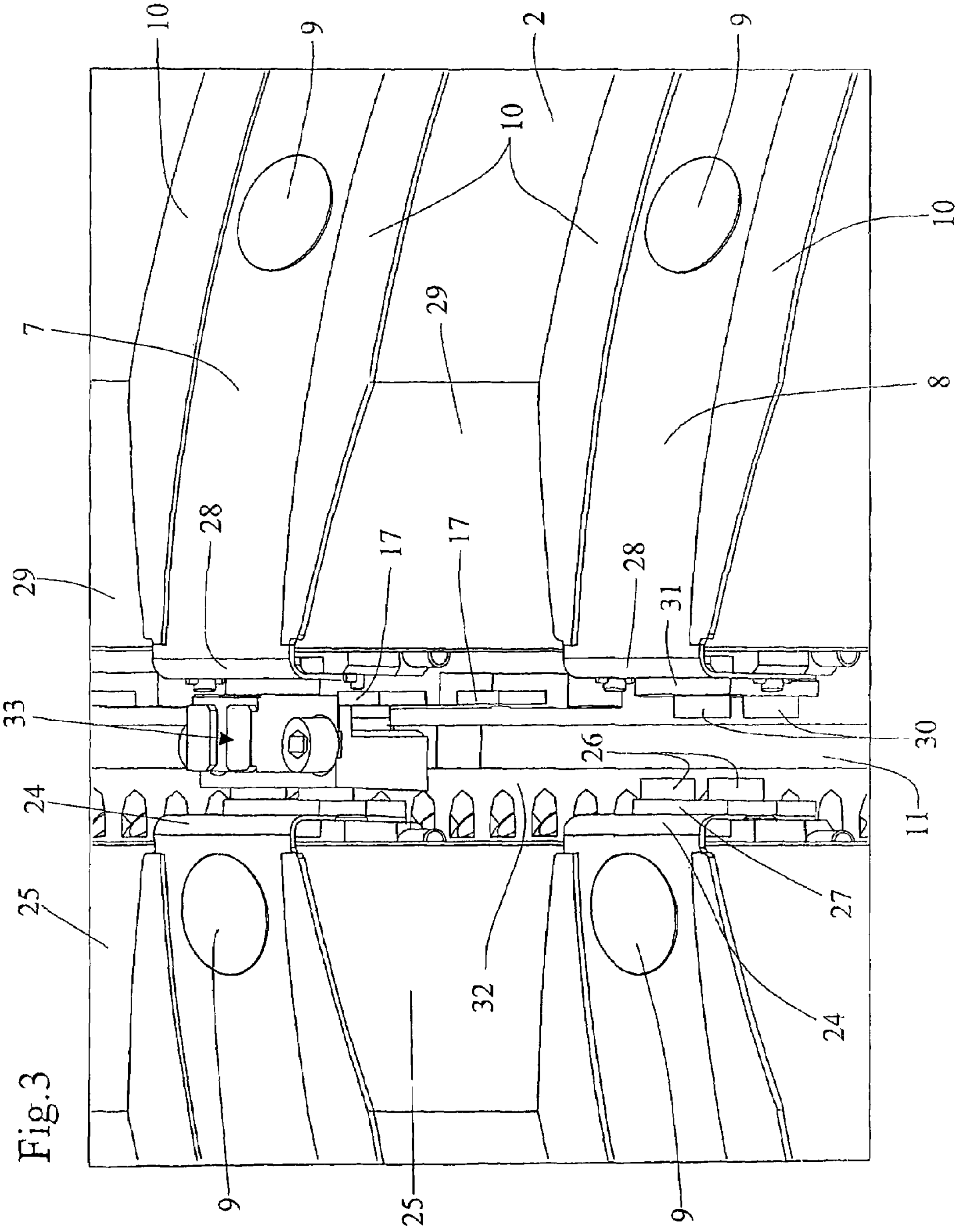

The invention will be best understood with reference to several embodiments and to drawings in which, FIG. 1 shows a perspective view of a first embodiment of the stamping cylinder;

FIG. 2 shows a perspective view of a second embodiment of the stamping cylinder and FIG. 3 shows a perspective view of the pit of the cylinder.

DETAILED DESCRIPTION

In FIG. 1, a first embodiment of the stamping cylinder according to the present invention is shown. In this embodiment, the cylinder 1 carries a stamping plate 2 according to the invention. The stamping plate 2 comprises several parallel tracks 3 to 8 on which the stamps 9 are formed. On both sides of the stamps 9 of a track (3 to 8), there are support borders 10 running along the length of the plate 2, which have approximately the same height than the stamps 9 and which are used to precisely adjust the position of a pressure cylinder (not shown) with respect to the stamps 9, said pressure cylinder being used to press the substrate against the foil during the stamping operation, as is known per se in the art.

Over the cylinder pit 11 in which the plate 1 is clamped, there is for each track 3 to 8 of stamps 9 a pair of supporting pieces 12, 13 which prevent the pressure cylinder to fall into the pit 11 when passing said pit 11. Said supporting pieces are made preferably of metal and provide a continuous surface of the support borders 10 over the pit 11 thus guiding and maintaining the position of the pressure cylinder over the pit in a smooth manner.

Each supporting piece 12, 13 is fixed in the cylinder pit 11 by a screw 14 or other equivalent means and comprise a plurality of holes 15 for vacuum (air under depression). The vacuum is brought in the cylinder pit 11 and the supporting pieces 12, 13 are mounted and fixed to a support part 16 connected to the vacuum supply and preferably held in the cylinder pit 11 by means of a screw. On the support part 16, a front alignment stop 17 is mounted in an adjustable manner, and the stop 17 passes through the supporting pieces 12, 13, to provide an alignment reference for the sheet to be embossed which is maintained against the pieces 12, 13 by the vacuum.

In FIG. 2, a second embodiment of the stamping cylinder 1 is shown. In this embodiment, the stamping plate of FIG. 1 is replaced by several stamping strips 18, each trip having a track 3' to 8' with support borders 10'. Other elements which are similar to the embodiment of FIG. 1 are referenced in identical manner. Each strip 3' to 8' is mated with a pair of supporting pieces 12, 13 to allow a smooth passage of the pressure cylinder over the pit 11 of the stamping cylinder 1.

In a similar manner to FIG. 1, each supporting piece 12, 13 comprises holes 15 for vacuum, is held on the cylinder through a screw 14 and a support part 16 connected to a vacuum supply and fixed in the pit 11 by a screw. The supporting pieces 12, 13 are traversed by an alignment stop 17 for aligning the sheet being embossed.

FIG. 3 shows in a more detailed manner an example of a pit 11 of a cylinder 1 on which a stamping plate 2 is mounted without the supporting pieces 12, 13. On the left side of the pit 11, one end of the plate 2 is cut to form notches with extensions 24 and cutouts 25. The end of the extensions 24 are bent and are clamped in the pit 11 by clamping means, such as screws 26 and clamp bar 27. The other end of the plate 1 is shaped in the same manner (extensions 28 and cutouts 29) and is clamped with clamping means, i.e. screws 30 and second clamp bar 31 which is also displaceable such as to pull the plate 2 on the cylinder under stress.

The vacuum supply for the holes 15 of the supporting pieces 12, 13 is indicated by reference 32.

Once the supporting pieces 12, 13 are mounted, as shown in FIGS. 1 and 2, they form a bridge over the pit 11 extending from cutouts 25 to cutouts 29.

The principle shown for mounting the stamping plate on a cylinder can be also used in the case of stamping strips 18 as in the second embodiment of FIG. 2.

The heating of the stamps can be made in conventional manner known in the art, for example, as known from GB 2 255 317 or U.S. Pat. No. 6,263,790, enclosed by reference in the present application to this effect. Preferably, the heating is made by heating the entire cylinder 1, either by a liquid such a water or oil which passes in a circuit in the cylinder 1, or in a variant by electrical heat resistances known per se in the art.

The number of plates per cylinder or of successive strips can be chosen depending on the circumstances or the format of the sheets to be printed. Preferably, there are three successive stamping plates per cylinder or three successive stamping strips around the circumference of the cylinder. In this case, the cylinder comprises three pits equally spaced around the circumference of the cylinder, all pits being similar to the pit 11 described here above.

In addition, the cylinder comprises intermediate stamps (referenced 33 in the figures). Theses intermediate stamps are placed in the cylinder pits 11 for each row of stamps 9 and they are used to maintain the pressure between the paper sheets being embossed and the foil and avoid misregistration or relative movement between the sheets being embossed and the foil.

The advantage of using a plate according to the first embodiment of the invention is to facilitate the mounting of the plate. On the other hand, the advantage of using strips as in the second embodiment is the fact that the strips can be individually adjusted, for example laterally.

A further advantage of the stamping medium according to the present invention with respect to the design known from U.S. Pat. No. 6,062,134 is the fact that there is no need anymore for an individual adjustment of the stamps.

As can be readily understood from the present description, the principle of the invention can also be used in planar stamping machines and not only on a cylinder. In this case, the stamping medium (plate or strips) are mounted on a plate replacing the cylinder disclosed in the present application, said plate being heated in a similar manner (for example by a liquid or electrical heating resistances).

The invention claimed is:

1. Stamping cylinder for applying a foil onto planar substrates, such as sheets of paper, wherein said stamping cylinder comprises at least a pit with clamping means for holding a stamping medium on said stamping cylinder, said stamping medium including at least a row of stamps distributed along the stamping medium, wherein said stamping medium has a cylindrical outer surface and is formed by a stamping plate or by stamping strips and wherein said stamping cylinder further includes at least a supporting piece forming a bridge over said pit to continuously and smoothly support a counter cylinder along the circumference of the stamping cylinder, wherein said supporting piece is mounted in said pit, wherein said supporting piece has a bottom concave surface, a first end and a second end, and wherein the first and second ends are disposed on opposite sides of the pit and wherein the bottom surface at both the first and second ends are in contact with the cylindrical outer surface of the stamping medium.

2. A stamping cylinder as defined in claim 1, comprising at least one supporting piece per row of stamps, wherein each adjacent pair of supporting pieces defines a gap therebetween.

3. A stamping cylinder as defined in claim 1, wherein the stamping medium includes several rows of stamps, and the stamping cylinder includes two supporting pieces per row of stamps.

4. A stamping cylinder as defined in claim 3, wherein support borders are provided along said stamping plate or said stamping strips on both sides of each row of stamps for supporting the counter cylinder and wherein said supporting pieces ensure a continuous surface of the support borders over said pit, wherein said support borders are raised up from an outer surface of said stamping plate or said stamping strips.

5. The stamping cylinder of claim 4, wherein the support borders and the supporting pieces together define and lie on a single cylindrical surface.

6. The stamping cylinder of claim 5, wherein one or more of the support borders taper near the pit.

7. The stamping cylinder of claim 5, wherein the support borders and the supporting pieces overlap circumferentially.

8. A stamping cylinder as claimed in claim 1, wherein said supporting piece comprises holes through which vacuum is applied to maintain the substrate being stamped against said supporting piece.

9. A stamping cylinder as claimed in claim 1, further comprising alignment stops for providing an alignment reference for the substrates to be stamped.

10. A stamping cylinder as claimed in claim 1, further comprising a circuit for heating with a liquid.

11. A stamping cylinder as claimed in claim 1, further comprising electrical heat resistors.

12. A stamping cylinder as claimed in claim 1, further comprising intermediate stamps in the pit for maintaining the pressure between the planar substrate being stamped and the foil.

13. A stamping cylinder as claimed in claim 4, wherein said supporting piece comprises holes through which vacuum is applied to maintain the substrate being stamped against said supporting piece.

14. A stamping cylinder as claimed in claim 13, further comprising alignment stops for providing an alignment reference for the substrates to be stamped, wherein at least one alignment stop is disposed on said supporting piece.

15. A stamping cylinder as claimed in claim 14, further comprising intermediate stamps in the pit for maintaining the pressure between the planar substrate being stamped and the foil.

16. A stamping machine comprising a stamping cylinder as defined claim 1.

17. Stamping cylinder for applying a foil onto planar substrates, such as sheets of paper, wherein said stamping cylinder comprises at least a pit with clamping means for holding a stamping medium on said stamping cylinder, said stamping medium including several rows of stamps distributed along the stamping medium, wherein said stamping medium is formed by a stamping plate or by stamping strips and wherein said stamping cylinder further includes at least one supporting piece per row of stamps, which supporting piece forms a bridge over said pit to continuously support a counter cylinder along the circumference of the stamping cylinder, wherein said supporting piece is mounted in said pit, wherein the stamping cylinder comprises two supporting pieces per row of stamps and wherein each adjacent pair of supporting pieces is separated by a gap.

18. A stamping cylinder as defined in claim 17, wherein support borders are provided along said stamping plate or said stamping strips on both sides of each row of stamps for supporting the counter cylinder and wherein said supporting pieces ensure a continuous surface of the support borders over said pit, wherein the stamping medium has a first upper surface, the stamps extending upward from the first upper surface of the stamping medium and having upper surfaces higher than the upper surface of the stamping medium, and the support borders having upper surfaces higher than the first upper surface of the stamping medium.

19. The stamping cylinder of claim 18, wherein the upper surfaces of the support borders are at approximately the same height as the upper surfaces of the stamps.

20. The stamping cylinder of claim 17, wherein a plurality of gaps between adjacent supporting pieces are wider than the adjacent support pieces.

21. The stamping cylinder of claim 18, wherein the upper surfaces of the support borders and the upper surfaces of the supporting pieces together define and lie on a single cylindrical surface.

* * * * *